(12) United States Patent
Lin et al.

(10) Patent No.: US 10,931,714 B2
(45) Date of Patent: Feb. 23, 2021

(54) DOMAIN NAME RECOGNITION METHOD AND DOMAIN NAME RECOGNITION DEVICE

(71) Applicant: Acer Cyber Security Incorporated, Taipei (TW)

(72) Inventors: Pin-Cyuan Lin, New Taipei (TW); Yu-Chun Wu, New Taipei (TW); Ming-Kung Sun, Taipei (TW); Zong-Cyuan Jhang, Taipei (TW); Yi-Chung Tseng, Taipei (TW); Chiung-Ying Huang, Taipei (TW)

(73) Assignee: Acer Cyber Security Incorporated, Taipei (TW)

( * ) Notice: Subject to any disclaimer, the term of this patent is extended or adjusted under 35 U.S.C. 154(b) by 114 days.

(21) Appl. No.: 16/412,406

(22) Filed: May 14, 2019

(65) Prior Publication Data
US 2020/0220897 A1 Jul. 9, 2020

(30) Foreign Application Priority Data

Jan. 8, 2019 (TW) .................................. 10810064.7

(51) Int. Cl.
*H04L 29/06* (2006.01)
*G06F 16/955* (2019.01)
(Continued)

(52) U.S. Cl.
CPC ...... *H04L 63/1483* (2013.01); *G06F 16/9566* (2019.01); *G06F 17/16* (2013.01); *H04L 61/1511* (2013.01); *H04L 61/306* (2013.01)

(58) Field of Classification Search
CPC ............. H04L 63/1483; H04L 61/1511; H04L 61/306; G06F 16/9566; G06F 17/16
(Continued)

(56) References Cited

U.S. PATENT DOCUMENTS 10,134,388 B1 * 11/2018 Lilly ..................... G10L 15/063
10,277,628 B1 * 4/2019 Jakobsson ............... H04L 51/00
(Continued)

FOREIGN PATENT DOCUMENTS

| CN | 106911717 | 6/2017 |
|----|-----------|--------|
| CN | 108282450 | 7/2018 |

(Continued)

OTHER PUBLICATIONS

Kolatch et al., "Look Alike/Sound Alike Algorithms for Assessing Drug Name Similarities", 2004, pp. 1-20. (Year: 2004).*
(Continued)

*Primary Examiner* — Peter C Shaw
(74) *Attorney, Agent, or Firm* — JCIPRNET

(57) ABSTRACT

The disclosure provides a domain name recognition method and a domain name recognition device. The domain name recognition method includes the following steps. A first string of a first domain name and a second string of a second domain name are obtained. Multiple characters of the first string and the second string are classified into multiple clusters. Multiple vectors corresponding to the clusters are generated, wherein each of the characters corresponds to one of the vectors. A first vector set corresponding to the first string and a second vector set corresponding to the second string are generated. A similarity of the first vector set and the second vector set is calculated.

10 Claims, 4 Drawing Sheets

(51) Int. Cl.
*G06F 17/16* (2006.01)
*H04L 29/12* (2006.01)
(58) Field of Classification Search
USPC .......................................................... 726/22
See application file for complete search history.

(56) References Cited

U.S. PATENT DOCUMENTS

2012/0042381 A1    2/2012   Antonakakis et al.
2014/0310811 A1   10/2014   Hentunen
2016/0065597 A1    3/2016   Nguyen et al.

FOREIGN PATENT DOCUMENTS

| TW | 200623026 | 7/2006 |
| TW | 201414260 | 4/2014 |
| TW | 201737120 | 10/2017 |

OTHER PUBLICATIONS

"Search Report of Europe Counterpart Application", dated Dec. 10, 2019, p. 1-p. 7.

\* cited by examiner

DOMAIN NAME RECOGNITION METHOD AND DOMAIN NAME RECOGNITION DEVICE

CROSS-REFERENCE TO RELATED APPLICATION

This application claims the priority benefit of Taiwan application serial no. 108100647, filed on Jan. 8, 2019. The entirety of the above-mentioned patent application is hereby incorporated by reference herein and made a part of this specification.

BACKGROUND

Technical Field

The disclosure relates to a domain name recognition method and a domain name recognition device, and more particularly to a domain name recognition method and a domain name recognition device capable of recognizing a malicious website.

Description of Related Art

Many malicious websites design their domain names much like secure websites (for example, google.com) which the user often visits. These malicious websites try to trick the user into providing his or her account and password, so as to access the user's online account. Once the account is successfully accessed, the user's personal data may be used to steal identity, defraud credit card, withdraw bank account deposit, browse the user's e-mails, and even change the password so that the user can no longer log into his or her online account.

Although we may detect these malicious websites using certain features (for example, domain name, webpage content, etc.), the degree of alertness varies with each user's understanding of the relative knowledge on information security. Most users often enter malicious websites without knowing, and when obvious abnormality is detected (for example, password being changed), relevant data are often already stolen.

In the past, the way to prevent malicious websites is to make use of the data feedbacked by users to sort out a list of suspicious websites. Then, information security experts are invited to carefully examine these websites and finally screen out the actual high-risk websites and blacklist them. However, such a process is very time consuming, causing the inability to update the blacklist in time when new malicious websites appear. In addition, a lot of information security experts are required to be involved in the sorting process, causing wastage of a great amount of human resources. Therefore, how to effectively recognize a malicious website should be a goal for persons skilled in the art to strive for.

SUMMARY

The disclosure provides a domain name recognition method and a domain name recognition device capable of effectively recognizing a malicious website.

The domain name recognition method of the disclosure includes the following steps. A first string of a first domain name and a second string of a second domain name are obtained. Multiple characters of the first string and the second string are classified into multiple clusters, and multiple vectors corresponding to the clusters are generated, wherein each of the characters corresponds to one of the vectors. A first vector set corresponding to the first string and a second vector set corresponding to the second string are generated. A similarity of the first vector set and the second vector set is calculated using an algorithm.

In an embodiment of the disclosure, the lengths of the first string and the second string are not necessarily the same.

In an embodiment of the disclosure, each of the vectors is a unit vector and different clusters correspond to different vectors.

In an embodiment of the disclosure, the algorithm is the dynamic time warping (DTW) algorithm.

In an embodiment of the disclosure, the algorithm generates a matrix with dimensions corresponding to the length of the first string and the length of the second string, establishes the shortest distance path from the bottom leftmost element to the top rightmost element in the matrix, calculates the distance of one of the first vector set and one of the second vector set corresponding to each of the elements on the shortest distance path, and calculates the similarity according to the sum of each of the distances on the shortest distance path.

In an embodiment of the disclosure, the value of each of the elements of the matrix is the sum of the distance of each of the elements and the smallest value of the value of element of the left element, the bottom element, and the bottom left element of each of the elements. Also, the shortest distance path is generated by selecting the element with the smallest element value in the left element, the bottom element, and the bottom left element of the top rightmost element from the top rightmost element of the matrix.

The disclosure provides a domain name recognition device, which includes a processor and a memory coupled to the processor. The processor obtains a first string of a first domain name and a second string of a second domain name; classifies multiple characters of the first string and the second string into multiple clusters and generates multiple vectors corresponding to the clusters, wherein each of the characters corresponds to one of the vectors; generates a first vector set corresponding to the first string and a second vector set corresponding to the second string; and calculates a similarity of the first vector set and the second vector set using an algorithm.

In an embodiment of the disclosure, the lengths of the first string and the second string are not necessarily the same.

In an embodiment of the disclosure, each of the vectors is a unit vector and different clusters correspond to different vectors.

In an embodiment of the disclosure, the algorithm is the DTW algorithm.

In an embodiment of the disclosure, the algorithm generates a matrix with dimensions corresponding to the length of the first string and the length of the second string, establishes the shortest distance path of the bottom leftmost element to the top rightmost element in the matrix, calculates the distance of one of the first vector set and one of the second vector set corresponding to each of the elements on the shortest distance path, and calculates the similarity according to the sum of each of the distances on the shortest distance path.

In an embodiment of the disclosure, the value of each of the elements of the matrix is the sum of the distance of each of the elements and the smallest value of the value of element of the left element, the bottom element, and the bottom left element of each of the elements. Also, the shortest distance path is generated by selecting the element with the smallest element value in the left element, the bottom element, and the bottom left element of the top rightmost element from the top rightmost element of the matrix.

Based on the above, the domain name recognition method and the domain name recognition device of the disclosure divide the characters of the domain name into multiple clusters and generate multiple vectors corresponding to the clusters, and further generate vector sets of the two domain names. Finally, the similarity of the two vector sets corresponding to the two domain names is calculated.

To make the aforementioned and other features of the disclosure more comprehensible, several embodiments accompanied with drawings are described in detail as follows.

DETAILED DESCRIPTION OF DISCLOSED EMBODIMENTS

In an embodiment, the Euclidean distance, the Hamming distance, the Edit distance, and the Cosine similarity may be used to perform the sequence similarity calculation. The Euclidean distance and the Hamming distance limit that the lengths of the two string vectors to be compared must be the same. However, in the context of domain name comparison, the lengths of various domain names are not the same most of the time. The Edit distance compares the similarity between two strings by calculating the minimum number of edit(s) required to convert one string into the other string. However, the minimum number of edit(s) does not effectively reflect the similarity of the domain names (for example, the minimum number of edit to convert "google" into "oogle" is 1 while the minimum number of edits to convert "google" into "g00g1e" is 3, but in fact the latter is a malicious website relatively more difficult to be detected by the user). The Cosine similarity requires the two strings to be first converted into the same length through a specific vectorization method. However, the intermediate process during vectorization may easily cause the order of the domain names to be distorted.

Figures 1, 2:
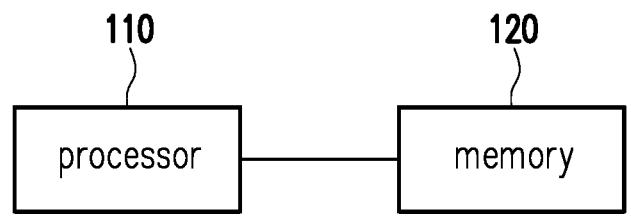
FIG. 1 is a block diagram of a domain name recognition device according to an embodiment of the disclosure.
FIG. 2 is a schematic diagram of clusters corresponding to vectors according to an embodiment of the disclosure.

FIG. 1 is a block diagram of a domain name recognition device according to an embodiment of the disclosure.

Referring to FIG. 1, a domain name recognition device 100 according to an embodiment of the disclosure includes a processor 110 and a memory 120 coupled to the processor 110. The processor 110 is, for example, a central processing unit (CPU), other programmable general purpose or special purpose microprocessor, a digital signal processor (DSP), a programmable controller, an application specific integrated circuit (ASIC), other similar component, or a combination of the above components. The memory 120 is, for example, any form of fixed or movable random-access memory (RAM), a read-only memory (ROM), a flash memory, a hard disk drive (HDD), a solid-state drive (SSD), other similar component, or a combination of the above components. The domain name recognition device 100 may be an electronic device such as a personal computer, a server, a notebook computer, a tablet computer, or a smart phone.

In an embodiment, the processor 110 can find a malicious website disguised as a normal secure website by comparing the domain names and assist the user in detecting that he or she has been directed into a high-risk website before the user is victimized. Specifically, when a list of secure domain names (for example, a list of domain names of 500 global websites or a whitelist) is given, the processor 110 can compare the similarity between the string of domain name of a specific website and the strings of domain names of the whitelist before the user enters the specific website. If the similarity between the string of domain name of the specific website and the strings of domain names of the whitelist is too high, but the domain name of the specific website is not a domain name in the whitelist, the processor 110 can generate a warning notification to the user to alert the user that the website being visited may be a malicious website.

In an embodiment, the processor 110 can classify characters in the string of domain name into multiple clusters. Multiple characters, which may be mistaken from one another by human eye, may be included in each of the clusters. Table 1 is an example of classifying characters into multiple clusters and Table 1 can be recorded in the memory 120.

TABLE 1

| Cluster | Character |
|---------|-----------|
| C0 | other symbols |
| C1 | o, 0 |
| C2 | P, q, g, 9 |
| C3 | i, 1, j, l |

Taking goo.gl as an example, each of the characters of goo.gl will be converted into the following code under the above classification:

| g | o | o | . | g | l |
|---|---|---|---|---|---|
| C2 | C1 | C1 | C0 | C2 | C3 |

In addition, each of the clusters can also correspond to a unit vector, as shown in FIG. 2. In the above example, there are 4 clusters, so the unit vector corresponding to each of the clusters has 4 elements and the unit vectors corresponding to each of the clusters do not overlap with one other.

The following will illustrate how to compare the similarity of strings of two domain names.

Figure 3A:
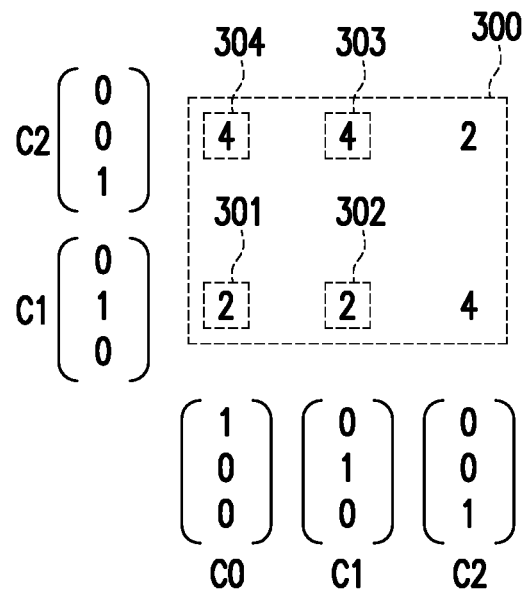
FIG. 3A to FIG. 3C are examples of calculating a similarity of two strings according to an embodiment of the disclosure.
Figure 3B:
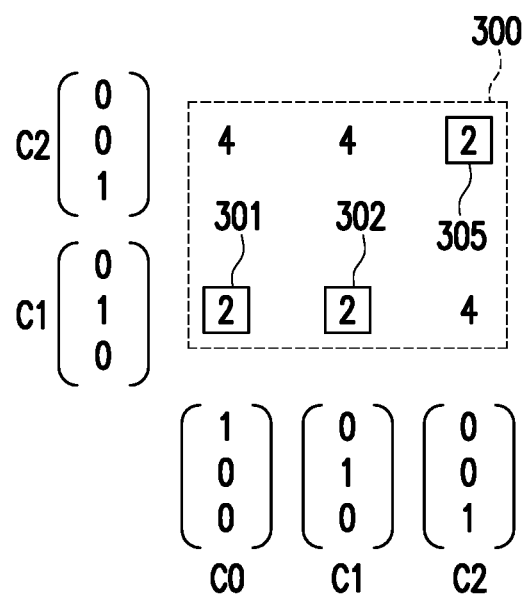
Figure 3C:
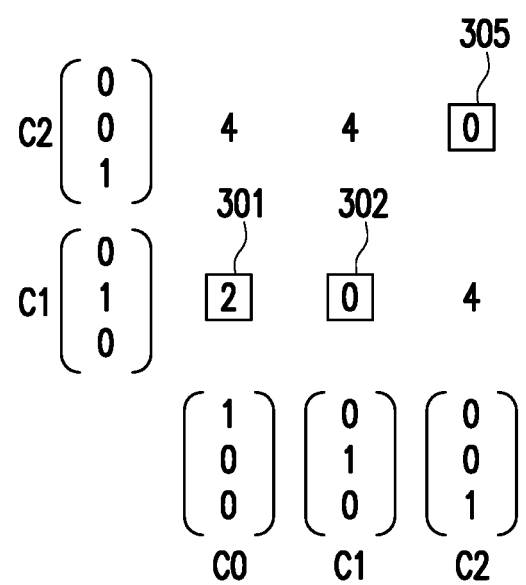

FIG. 3A to FIG. 3C are examples of calculating similarity of two strings according to an embodiment of the disclosure.

Referring to FIG. 3A, for ease of understanding, the lengths of the first string and the second string are respectively assumed to be 3 and 2; a first character, a second character, and a third character of the first string are respectively classified into clusters C0, C1 and C2; and a first character and a second character of the second string are respectively classified into clusters C1 and C2. It is worth noting that in the examples of FIG. 3A to FIG. 3C, the number of clusters is three (i.e. C0, C1, and C2). The processor 110 can perform the following operations based on the DTW algorithm.

In particular, the processor 110 can generate a matrix 300 with dimensions corresponding to the lengths of the first string and the second string (i.e. a 2×3 matrix). In the matrix 300, each of the element values is calculated by calculating the distance of two vectors corresponding to each of the elements plus the smallest value in the left element, the bottom element, and the bottom left element of the element. For example, since an element 301 does not have a left element, a bottom element, and a bottom left element, the value of the element 301 is the distance 2 of C1 and C0 (the distance of two clusters is the sum of absolute value of subtraction of all corresponding elements of the two clusters). The value of an element 302 is the sum 2 of the distance 0 of C1 and C1 plus the left element value 2 of the element 302, as the element 302 does not have a bottom element and a bottom left element. Since the smallest value of a left element 304, the bottom element 302, and the bottom left element 301 of an element 303 is 2, and the distance of C1 and C2 corresponding to the element 303 is 2, the value of the element 303 is 2 plus 2 equals to 4. The values of other elements may be deduced so on and so forth.

Referring to FIG. 3B, after calculating the values of all of the elements in the matrix 300, the processor 110 establishes the shortest distance path of the bottom leftmost element to the top rightmost element in the matrix. For example, the processor 110 finds the element 302 having the smallest value in the left element, the bottom element, and the bottom left element of the element 305 based on the element 305, and finds the element 301 having the smallest value in the left element, the bottom element, and the bottom left element of the element 302 (the element 302 does not have a bottom element and a bottom left element, so the element 301 is directly found). Therefore, the element 301, the element 302, and the element 305 form the shortest distance path of the matrix 300.

Referring to FIG. 3C, the processor 110 recalculates the distance of two clusters corresponding to all of the elements on the shortest distance path. For example, the value of the element 301 is recalculated as the distance 2 of C0 and C1, the value of the element 302 is recalculated as the distance 0 of C1 and C1, and the value of the element 305 is recalculated as the distance 0 of C2 and C2.

Finally, processor 110 sums up the recalculated values of all of the elements on the shortest distance path and divides by the sum of lengths of the first string and the second string to obtain a final value. For example, the final value=(2+0+0)/(2+3)=0.4. The smaller the final value, the higher the similarity of the two strings. Therefore, the processor 110 can issue a warning notification to alert the user when the final value above is less than a threshold value.

Figure 4:
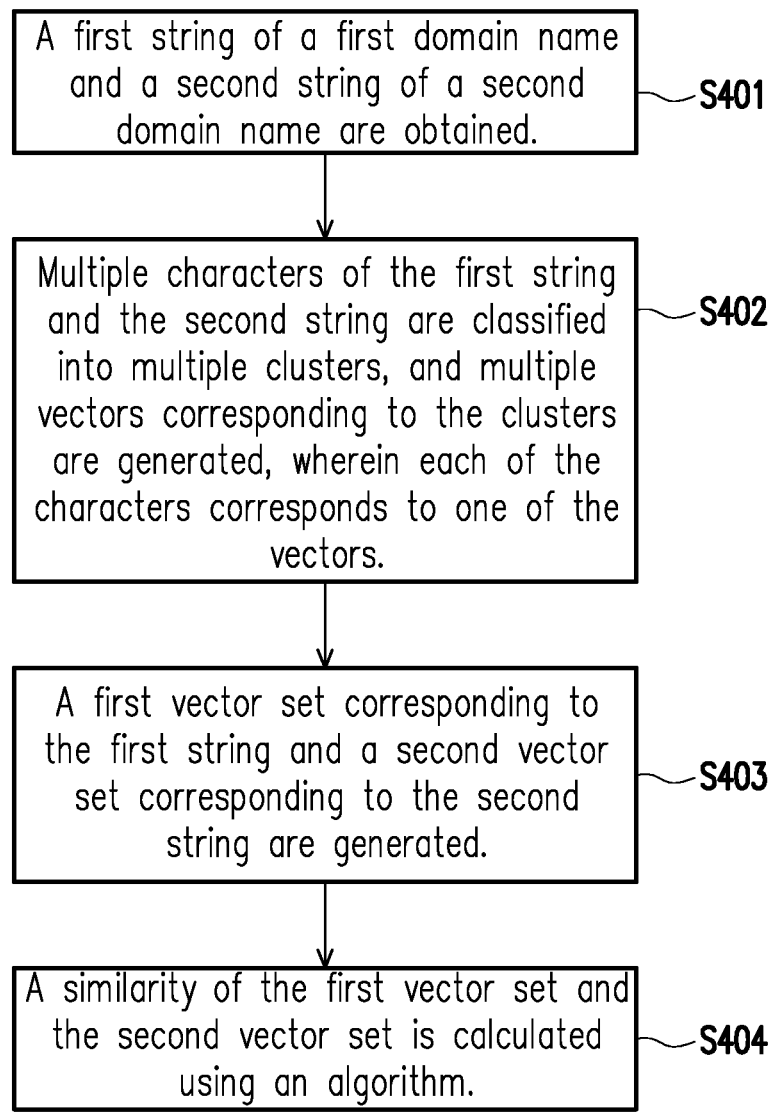
FIG. 4 is a flowchart of a domain name recognition method according to an embodiment of the disclosure.

FIG. 4 is a flowchart of a domain name recognition method according to an embodiment of the disclosure.

Referring to FIG. 4, in Step S401, a first string of a first domain name and a second string of a second domain name are obtained.

In Step S402, multiple characters of the first string and the second string are classified into multiple clusters, and multiple vectors corresponding to the clusters are generated, wherein each of the characters corresponds to one of the vectors.

In Step S403, a first vector set corresponding to the first string and a second vector set corresponding to the second string are generated.

In Step S404, a similarity of the first vector set and the second vector set is calculated using an algorithm.

In summary, the domain name recognition method and the domain name recognition device of the disclosure divide the characters of the domain name into multiple clusters and generate multiple vectors corresponding to the clusters, and further generate vector sets of the two domain names. Finally, the similarity of the two vector sets corresponding to the two domain names is calculated. When the similarity is too high, a warning notification can be issued to alert the user. The disclosure adopts the DTW algorithm for comparing the similarity of the strings. Since the algorithm is designed based on dynamic programming, the time taken for comparison can be significantly reduced. In addition, the method of the disclosure relative to the blacklist of domain names may also prevent the situation whereby the blacklist is generated after the user has been victimized from happening.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A domain name recognition method performed by hardware electronic device with a processor and memory, comprising: obtaining a first string of a first domain name and a second string of a second domain name; classifying a plurality of characters of the first string and the second string into a plurality of clusters, and generating a plurality of vectors corresponding to the plurality of clusters, wherein each of the plurality of characters corresponds to one of the plurality of vectors;

generating a first vector set corresponding to the first string and a second vector set corresponding to the second string; and calculating a similarity between the first vector set and the second vector set using an algorithm, wherein the algorithm is a dynamic time warping (DTW) algorithm.

2. The domain name recognition method according to claim 1, wherein lengths of the first string and the second string are not necessarily the same.

3. The domain name recognition method according to claim 1, wherein each of the plurality of vectors is a unit vector and different ones of the clusters correspond to different ones of the vectors.

4. The domain name recognition method according to claim 1, wherein the algorithm generates a matrix corresponding to a length of the first string and a length of the second string, establishes a shortest distance path of a bottom leftmost element to a top rightmost element in the matrix, calculates a distance of one of the first vector sets on and one of the second vector sets corresponding to each of the elements on the shortest distance path, and calculates a similarity according to a sum of each of the distances on the shortest distance path.

5. The domain name recognition method according to claim 4, wherein a value of each of the elements of the matrix is a sum of the distance of each of the elements plus a smallest value of a value of an element of a left element, a bottom element, and a bottom left element of each of the elements, and the shortest distance path is generated by selecting an element with a smallest element value in the left element, the bottom element, and the bottom left element of the top rightmost element from the top rightmost element of the matrix.

6. A domain name recognition device, comprising: a processor; and a memory coupled to the processor, wherein the processor obtains a first string of a first domain name and a second string of a second domain name; classifies a plurality of characters of the first string and the second string into a plurality of clusters, and generates a plurality of vectors corresponding to the plurality of clusters, wherein each of the plurality of characters corresponds to one of the plurality of vectors; generates a first vector set corresponding to the first string and a second vector set corresponding to the second string; and calculates a similarity between the first vector set and the second vector set using an algorithm, wherein the algorithm is a dynamic time warping (DTW) algorithm.

7. The domain name recognition device according to claim 6, wherein lengths of the first string and the second string are not necessarily the same.

8. The domain name recognition device according to claim 6, wherein each of the plurality of vectors is a unit vector and different ones of the clusters correspond to different ones of the vectors.

9. The domain name recognition device according to claim 6, wherein the algorithm generates a matrix corresponding to a length of the first string and a length of the second string, establishes a shortest distance path of a bottom leftmost element to a top rightmost element in the matrix, calculates a distance of one of the first vector sets on and one of the second vector sets corresponding to each of the elements on the shortest distance path, and calculates a similarity according to a sum of each of the distances on the shortest distance path.

10. The domain name recognition device according to claim 9, wherein a value of each of the elements of the matrix is a sum of the distance of each of the elements plus a smallest value of a value of an element of a left element, a bottom element, and a bottom left element of each of the elements, and the shortest distance path is generated by selecting an element with a smallest element value in the left element, the bottom element, and the bottom left element of the top rightmost element from the top rightmost element of the matrix.

* * * * *